United States Patent
US 10,932,029 B2
Ito et al.
(45) Date of Patent: Feb. 23, 2021

(54) HEADPHONES

(71) Applicant: SONY CORPORATION, Tokyo (JP)

(72) Inventors: Tomohiro Ito, Tokyo (JP); Yushi Koyama, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/486,628

(22) PCT Filed: Feb. 28, 2018

(86) PCT No.: PCT/JP2018/007460
§ 371 (c)(1),
(2) Date: Aug. 16, 2019

(87) PCT Pub. No.: WO2018/168462
PCT Pub. Date: Sep. 20, 2018

(65) Prior Publication Data
US 2019/0394555 A1    Dec. 26, 2019

(30) Foreign Application Priority Data

Mar. 15, 2017  (JP) ................. 2017-049499

(51) Int. Cl.
  *H04M 3/00*  (2006.01)
  *H04M 7/00*  (2006.01)
  *H04R 1/10*  (2006.01)
(52) U.S. Cl.
  CPC .......... *H04R 1/1066* (2013.01); *H04R 1/105* (2013.01); *H04R 1/1008* (2013.01); *H04R 1/1033* (2013.01); *H04R 1/1091* (2013.01); *H04R 2499/15* (2013.01)

(58) Field of Classification Search
CPC .. H04R 1/1066; H04R 1/1008; H04R 1/1033; H04R 1/105
See application file for complete search history.

(56) References Cited

U.S. PATENT DOCUMENTS

| 2008/0112586 | A1* | 5/2008 | Ito .................. H04R 1/1008 381/371 |
| 2010/0158265 | A1 | 6/2010 | Riese |
| 2011/0188693 | A1 | 8/2011 | Kim |
| 2013/0100288 | A1* | 4/2013 | Anderson, Jr. ........ H04H 20/61 348/148 |

(Continued)

FOREIGN PATENT DOCUMENTS

| CN | 101198193 A | 6/2008 |
| CN | 102047687 A | 5/2011 |

(Continued)

OTHER PUBLICATIONS

International Search Report and Written Opinion of PCT Application No. PCT/JP2018/007460, dated May 29, 2018, 09 pages of ISRWO.

(Continued)

*Primary Examiner* — Simon King
(74) *Attorney, Agent, or Firm* — Chip Law Group (57) ABSTRACT

Provided is a headphone that includes a housing that houses a sound output unit, a slider configured to support the housing, and a support unit attached to a head mounted display. The support unit slidably supports the slider and the support unit is attached to a band of the head mounted display.

11 Claims, 8 Drawing Sheets

(56) References Cited

U.S. PATENT DOCUMENTS

| | | | |
|---|---|---|---|
| 2013/0272560 A1 | 10/2013 | Dougherty et al. | |
| 2014/0306891 A1* | 10/2014 | Latta | G06F 3/017 |
| | | | 345/158 |
| 2016/0249124 A1* | 8/2016 | Drinkwater | H04R 1/105 |
| 2017/0230740 A1 | 8/2017 | Drinkwater et al. | |

FOREIGN PATENT DOCUMENTS

| | | |
|---|---|---|
| CN | 205691868 U | 11/2016 |
| EP | 1921889 A1 | 5/2008 |
| EP | 2114092 A1 | 11/2009 |
| EP | 2346267 A2 | 7/2011 |
| JP | 10-294983 A | 11/1998 |
| JP | 2002-539701 A | 11/2002 |
| JP | 2011-176771 A | 9/2011 |
| JP | 4899810 B2 | 3/2012 |
| JP | 2012-508500 A | 4/2012 |
| KR | 10-2008-0042736 A | 5/2008 |
| WO | 00/54554 A1 | 9/2000 |
| WO | 2010/053325 A2 | 5/2010 |
| WO | 2013/062454 A1 | 5/2013 |

OTHER PUBLICATIONS

Extended European Search Report of EP Application No. 18768045.9, dated Jan. 8, 2020, 07 pages.

* cited by examiner

HEADPHONES

CROSS REFERENCE TO RELATED APPLICATIONS

This application is a U.S. National Phase of International Patent Application No. PCT/JP2018/007460 filed on Feb. 28, 2018, which claims priority benefit of Japanese Patent Application No. JP 2017-049499 filed in the Japan Patent Office on Mar. 15, 2017. Each of the above-referenced applications is hereby incorporated herein by reference in its entirety.

TECHNICAL FIELD

The present technology relates to headphones.

BACKGROUND ART

In recent years, various head mounted displays (display headset devices) for games using virtual reality (VR) have been announced one after another, and "realistic feeling/immersive feeling" is mentioned as a common keyword. Those are for obtaining a bodily sensation as if it were a reality, by the synergistic effect of the image display in all directions of view and the sound full of realistic feeling.

There are several methods for providing sound to a user at the time of use of such head mounted displays (Patent Document 1). For example, a head mounted display is configured integrally with a sound unit, or the user uses a type of headphones including a headband and separated from a head mounted display, or the like.

CITATION LIST

Patent Document

Patent Document 1: Japanese Patent Application Laid-Open No. 2006-186756

SUMMARY OF THE INVENTION

Problems to be Solved by the Invention

In a head mounted display with which a sound unit is integrated, small general-purpose sound open type headphones are often included, and there are problems such as low sound quality, poor wearing feeling due to that the positions of the headphones are fixed, and lack of powerfulness due to the low degree of sealing.

Furthermore, in a type of headphones including a headband and separated from a head mounted display, a user can select favorite commercially available headphones, but the headphones are not considered to be used simultaneously with the head mounted display. Thus, there is a problem that, in a case where it is difficult to seal an ear pad due to interference between the ear pad and the head mounted display, the sound lacks powerfulness, and there is an excessive sense of obstruction. Moreover, there is also a problem that, it is necessary to wear the headphones by groping in a state where eyes are covered by the head mounted display and it is difficult to see surroundings, and it is inconvenient.

The present technology has been made in view of such problems, and it is an object to provide headphones enabled to improve wearing feeling at the time of combined use with a head mounted display.

Solutions to Problems

To solve the problems described above, the present technology is a headphone including: a housing that houses a sound output unit; a slider configured to support the housing; and a support unit attached to a head mounted display and configured to slidably support the slider.

Effects of the Invention

According to the present technology, wearing feeling can be improved at the time of combined used with a head mounted display. Note that, the effect described here is not necessarily limited, and can be any effect described in the present description.

MODE FOR CARRYING OUT THE INVENTION

Hereinafter, embodiments of the present technology will be described with reference to the drawings. Note that, description will be made in the following order.

<1. Embodiment>
[1-1. Configuration of Head Mounted Display]
[1-2. Configuration of headphones]
[1-3. Use of headphones]
<2. Modifications>

1. Embodiment

[1-1. Configuration of Head Mounted Display]

Figure 1:
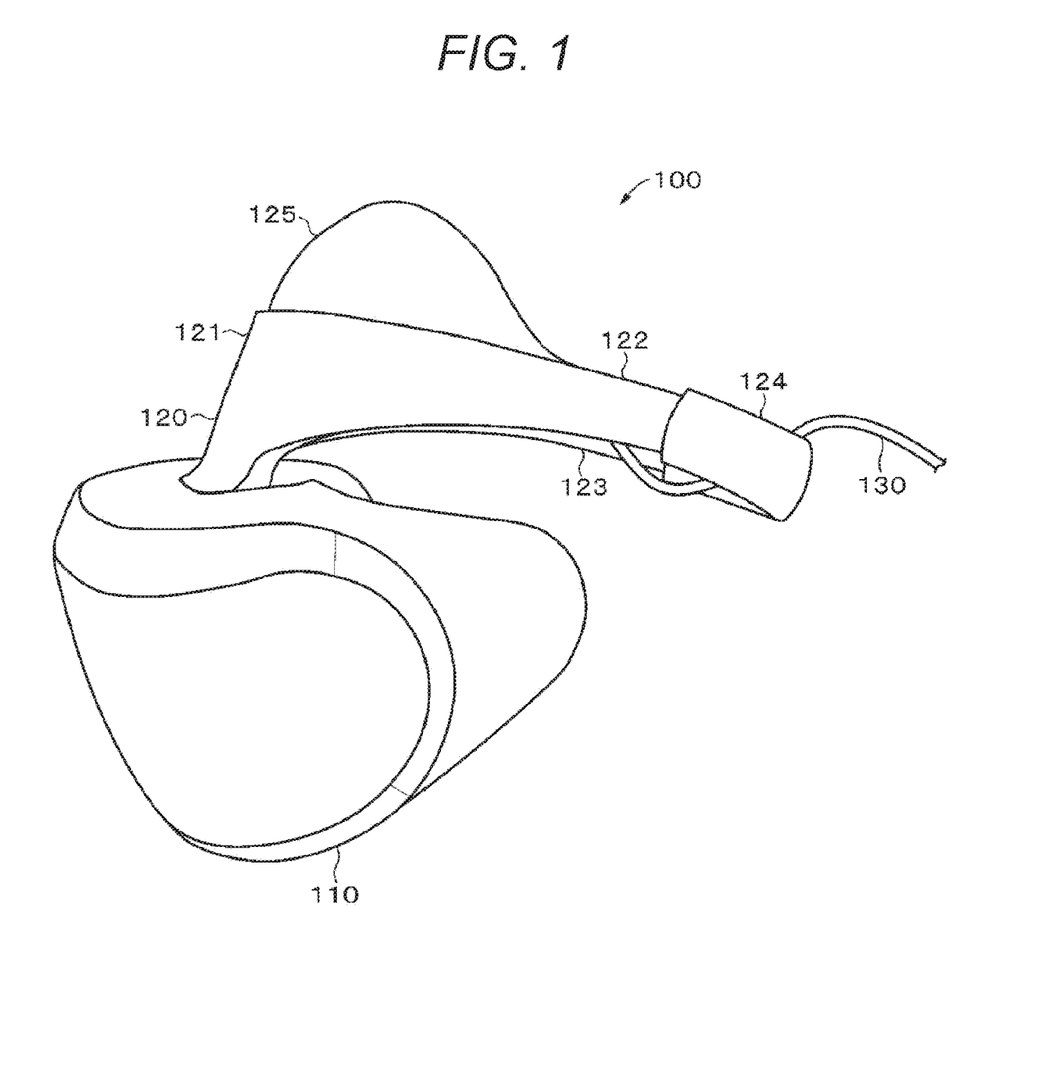
FIG. 1 is a perspective view illustrating a configuration of a head mounted display.

First, a configuration will be described of a head mounted display (hereinafter referred to as an HMD) 100 used in combination with headphones according to the present embodiment. FIG. 1 is a perspective view illustrating an appearance configuration of the HMD 100.

The HMD 100 configures a content providing system from, for example, an entertainment apparatus, a display, a camera microphone unit, and a controller (all not illustrated). Contents include, for example, games, movies, and television broadcasting.

The entertainment apparatus and the display are connected to each other via, for example, a High-Definition Multimedia Interface (HDMI) (registered trademark) cable, or the like. The entertainment apparatus and the camera microphone unit are connected to each other via, for example, an HDMI (registered trademark) cable, a universal serial bus (USB) cable, or the like. Furthermore, the HMD 100 and the entertainment apparatus are connected to each other via, for example, an HDMI (registered trademark) cable, a USB cable, or the like.

The entertainment apparatus is, for example, a personal computer, a stationary game console, a DVD player, a Blu-ray (registered trademark) player, or the like. The entertainment apparatus outputs, to the HMD 100 or the display, a video signal generated by executing a preinstalled game program or reproducing an optical disk.

The display is a display device, for example, a liquid crystal display, an organic electro luminescence (EL) display, or the like, and displays a video represented by a video signal output from the entertainment apparatus.

The camera microphone unit recognizes motion of the HMD 100 and outputs motion information of the HMD 100 to the entertainment apparatus. As a result, the motion of the HMD 100 and the video displayed on a display unit of the HMD 100 can be synchronized with each other.

The HMD 100 includes a casing 110, a band 120, and a cord 130.

The casing 110 is formed in a box shape, and is formed such that a surface is opened on a side to come in contact with a user's face. A space is formed inside the casing 110, and a control unit, a display unit, a video vision optical system, a drive unit, a motion sensor (all not illustrated), and the like are provided in the space.

The inner surface of the casing 110 supports the display unit in front of the user's eyes by coming in contact with the user's face at the time of wearing the HMD 100.

The display unit is a display, for example, a liquid crystal display, an organic electroluminescence (EL) display, or the like, and displays a video based on a video signal output from the entertainment apparatus.

The video vision optical system is an optical system such as a lens arranged between the display unit and eyes of the user who views the video displayed on the display unit.

The control unit includes a central processing unit (CPU), random access memory (RAM), read only memory (ROM), and the like. In the ROM, a program read and operated by the CPU, and the like are stored. The RAM is used as work memory of the CPU. The CPU executes various types of processing in accordance with the program stored in the ROM and issues commands, thereby performing control of the entire HMD 100, such as video output control to the display unit, operation control, or the like. Furthermore, predetermined processing is performed of a video signal, an operation signal, and the like transmitted from the entertainment apparatus.

The program executed by the control unit may be installed in the control unit in advance, or may be distributed by downloading, storage medium, or the like, and installed by a user oneself.

External input/output is, for example, a High-Definition Multimedia Interface (HDMI) (registered trademark) port, a USB port, or the like for connecting the HMD 100 to an external device. Note that, connection between the HMD 100 and the external device is not limited to wired communication, and wireless communication may be used such as wireless local area network (LAN) such as Wi-Fi, Bluetooth (registered trademark), or ZigBee.

The motion sensor detects a moving speed, moving direction, angular velocity, and the like of the HMD 100 with, for example, an acceleration sensor, an angle speed sensor, a gyro sensor, and the like for two or three axis directions, and outputs them to the control unit or the entertainment apparatus.

The band 120 includes a front band portion 121, a left band portion 122, a right band portion 123, and a slide band portion 124, and is formed in a ring shape to surround the user's head from the forehead to the back of the head.

The front band portion 121 is formed such that the bottom center extends downward and is connected to the top surface of the casing 110. Furthermore, to reliably support the casing 110 in a state of being in contact with the user's forehead at the time of wearing the HMD 100, the front band portion 121 is formed such that the width in the vertical direction is wide compared to the left band portion 122, the right band portion 123, and the slide band portion 124. Moreover, to reliably support the casing 110 by coming in contact with the user's forehead at the time of wearing the HMD 100, the front band portion 121 is provided with a head contact portion 125 to come in contact with a region from the user's forehead to the top of the head.

The left band portion 122 and the right band portion 123 are integrally formed with the front band portion 121. The left band portion 122 is formed to extend rearward from the left side of the front band portion 121. The right band portion 123 is formed to extend rearward from the right side of the front band portion 121.

The slide band portion 124 is formed to be able to change a distance between the slide band portion 124 and the casing 110, by sliding relative to the left band portion 122 and the right band portion 123 in a direction toward the casing 110 or in a direction away from the casing 110. The slide band portion 124 slides in the direction away from the casing 110 by application of force such as pulling by user's hand. Furthermore, the slide band portion 124 is formed to slide in the direction toward the casing 110 due to the action of an elastic body such as a spring, when the slide band portion 124 is released from pulling force in the direction away from the casing 110 (such as releasing the slide band portion 124 pulled by the hand).

When wearing the HMD 100, the user slides the slide band portion 124 by pulling it in the direction away from the casing 110, enlarges a space between the casing 110 and the slide band portion 124, and arrange the head in the space. Then, when the user releases the slide band portion 124 pulled by the hand, the slide band portion 124 slides in the direction toward the casing 110, and supports the HMD 100 from behind by coming in contact with the back of the user's head.

To reliably support the casing 110, the front band portion 121 is formed to come in contact with a region from the user's forehead to the top of the head, the region being higher than a contact position of the slide band portion 124 on the back of the head. Thus, when the face of the user wearing the HMD 100 faces the front, the left band portion 122 and the right band portion 123 are inclined downward from the front (user's face direction) to the rear (direction of the back of the user's head) when viewed from the side of the temporal region of the user's head.

Note that, a cover is provided to cover the inner surface side of the front band portion 121 and the inner surface side of the slide band portion 124. The cover functions as a cushioning material in a portion in contact with the back of the user's head in the inner surface of the front band portion 121 and the inner surface of the slide band portion 124. Note that, in place of the cover, an elastic body may be provided such as a cushion or rubber.

The HMD 100 is formed as described above.

[1-2. Configuration of Headphones]

Next, with reference to FIGS. 2, 3A, 3B, 4A, 4B, 5, and 6, a configuration will be described of headphones according to the present technology. Note that, the headphones include a left headphone 200 and a right headphone 300, and description will be made with reference to the left headphone 200. Configurations of the left headphone 200 and the right headphone 300 are the same as each other except that they are symmetrical with each other.

Figure 2:
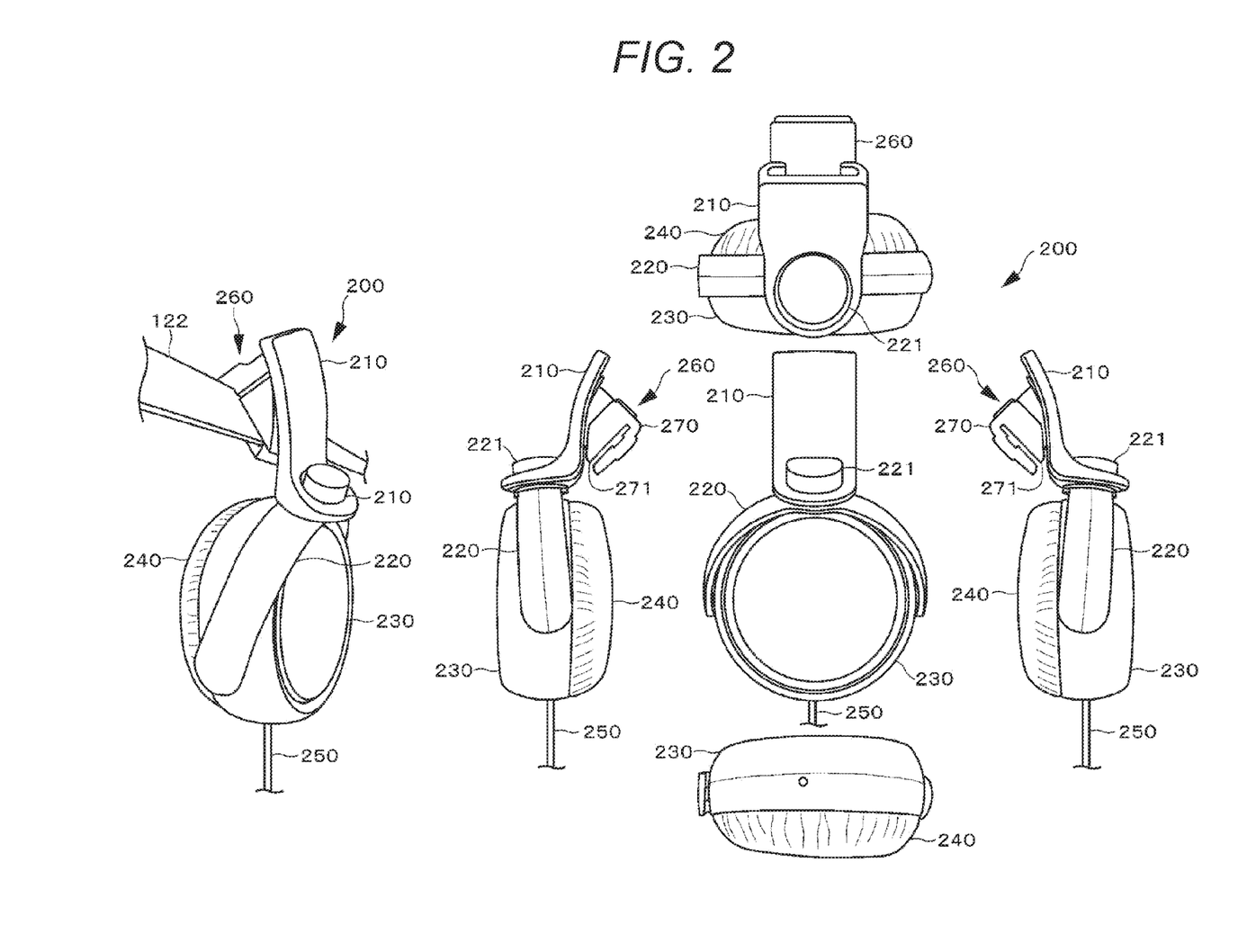
FIG. 2 is a diagram illustrating a configuration of a headphone according to the present technology.

The left headphone 200 includes a slider 210, a hanger 220, a housing 230, an ear pad 240, a cord 250, and a support mechanism 260. The support mechanism 260 is a mechanism for attaching the left headphone 200 to the HMD 100 and supporting the left headphone 200, and includes a band holding unit 270, a rotation unit 280, and a slide guide 290. The support mechanism 260 corresponds to a support unit in the claims. The rotation unit 280 corresponds to an operation unit in the claims.

The slider 210 is attached to the left band portion 122 of the HMD 100 via the support mechanism 260, and is enabled to adjust a position of the housing 230 and the ear pad 240 by sliding.

Inside the slider 210, the slide guide 290 of the support mechanism 260 is slidably formed. The slider 210 slides with respect to the slide guide 290, whereby a position of the hanger 220 can be moved downward or upward with respect to the band 120 of the HMD 100. The position of the hanger 220 is moved downward or upward, whereby the position of the housing 230 and the ear pad 240 can be adjusted to user's desired positions.

A position of the slider 210 is adjusted, whereby the ear pad 240 can be adjusted to a position facing the user's ear in accordance with the size of the user's head and a distance between the ear and the top of the head. As a result, the user can obtain wearing feeling in accordance with one's physical characteristics and preferences. On the other hand, in a case where the headphones are not used, the slider 210 is shrunk into a housed state, whereby a storage space can be saved.

The hanger 220 is connected to the lower end of the slider 210. The hanger 220 is formed in an inverted U-shape, and rotatably supports the housing 230 at the left and right ends. The hanger 220 rotatably supports the housing 230 by axial support with support pins (not illustrated) respectively protruding inward from a pair of tips. As a result, at the time of wearing the headphones, a direction of the ear pad 240 is changed in accordance with a shape around the user's ear, and the ear pad 240 can be made to face the ear in a state suitable for a shape of the temporal region of the user's head.

The slider 210 and the hanger 220 are connected to each other via a twist mechanism 221 so that the hanger 220 is rotatable in the horizontal direction. The twist mechanism 221 is formed, for example, by connecting the slider 210 and the hanger 220 to a shaft in the vertical direction.

The housing 230 functions as a housing unit that houses a sound processing circuit, a driver unit, a speaker (not illustrated), and the like therein. The housing 230 is formed by using, for example, a synthetic resin such as plastic. The sound processing circuit performs, for example, predetermined sound signal processing such as signal amplification processing, equalizing processing, noise canceling processing, and the like on a sound signal that drives a speaker. The driver unit and the speaker are sound output means that outputs, as sound, a sound signal processed by the sound processing circuit.

The ear pad 240 is provided on the surface of a side facing the temporal region of the user's head in the housing 230. The ear pad 240 is formed to have elasticity, and functions as a cushioning member between the housing 230 and the temporal region of the user's head by being interposed between the housing 230 and the temporal region of the user's head. In other words, the ear pad 240 prevents the housing 230 including a hard material not easily deformed from coming in direct contact with the temporal region of the user's head and causing discomfort or pain to the user at the time of wearing the headphones.

Furthermore, the ear pad 240 also plays a role of improving sound quality such as improvement of reproducibility of a low frequency range by sealing a space formed by the ear pad 240 and the temporal region of the user's head. Furthermore, the ear pad 240 also plays a role of preventing the sound output from the speaker from leaking to the outside. Moreover, the ear pad 240 also serves to block external noise and to facilitate listening to the sound from the speaker.

The ear pad 240 includes a cushioning material formed annularly using low repulsion urethane and a synthetic leather cover that covers the cushioning material, and is formed without sewing. The cover covers the entire surface of the cushioning material and comes in direct contact with the temporal region of the user's head at the time of wearing the headphones 10. The low repulsion urethane is used for the ear pad 240, whereby a high sealing feeling can be implemented even if side pressure on the user's ear and temporal region of the head is weak, and the user can listen to the sound with high sound quality.

Note that, the ear pad 240 is not limited to the low repulsion urethane, and the cushioning material may be formed by using any material as long as it is an elastic material such as urethane foam, cotton, chemical fiber, and the like, and may be formed with sewing. Furthermore, the cover is not limited to synthetic leather, and for example, natural leather may be used, and preferably includes a material having a good touch.

The cord 250 includes an L channel lead wire that is a lead wire for a sound signal, a ground wire, and the like inserted therein, and is for transmitting a sound signal. The cord 250 is connected to the sound processing circuit housed in the housing 230.

Furthermore, a plug (not illustrated) is provided at the other end of the cord 250. The plug is connected to a television receiver, an entertainment apparatus, or the like. The cord 250 is preferably provided to hang directly below from a position of the lowest point of the housing 230. This is because the cord 250 may get in the way on the side surface or the top surface of the headphones when the headphones are attached to the HMD 100.

Note that, the headphones may be so-called closed headphones, or may be open air headphones using a breathable urethane foam ear pad.

Figure 3A:
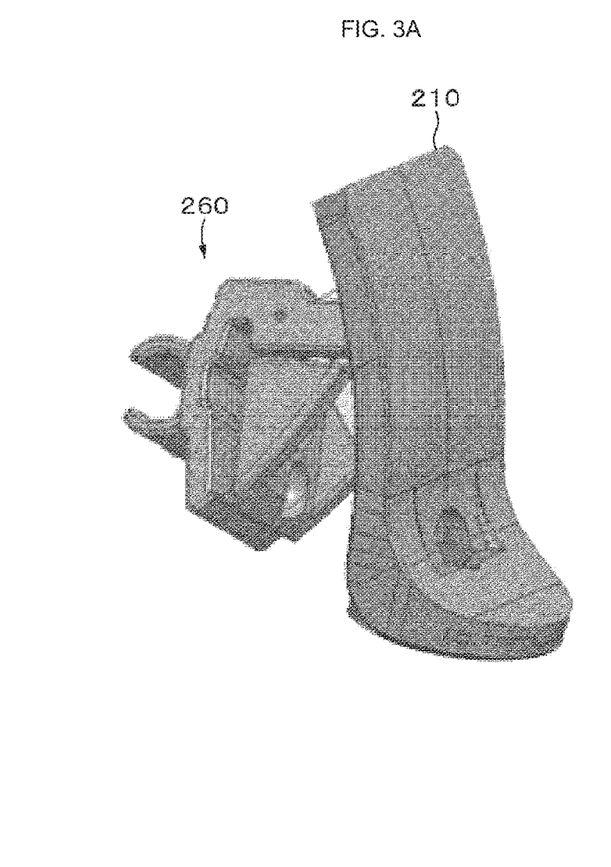
FIG. 3A is a perspective view of a support mechanism and a slider of the headphone.
Figure 3B:
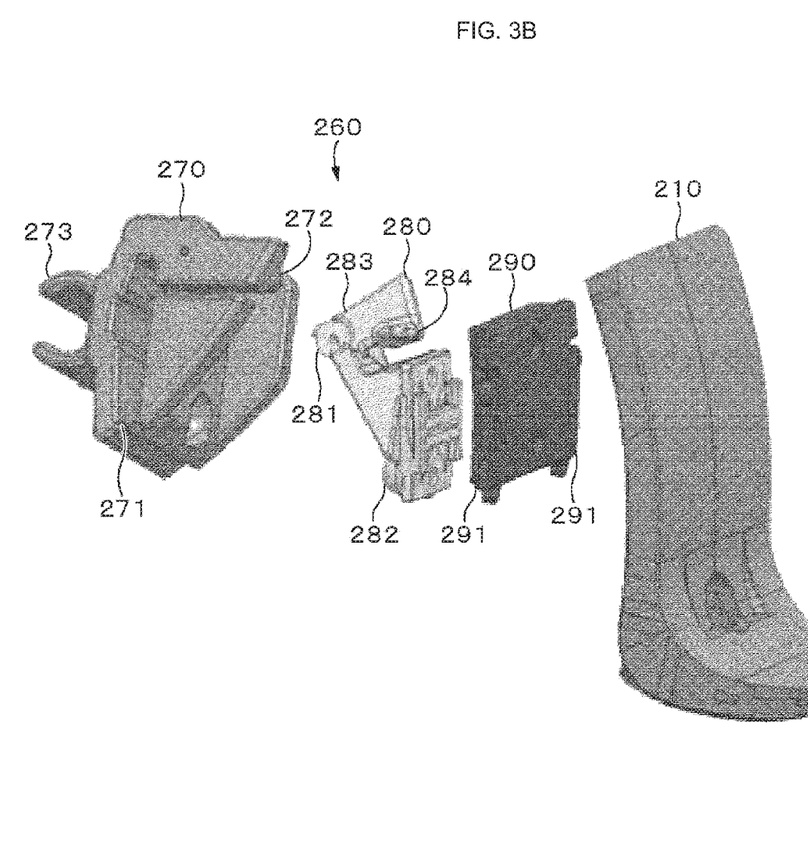
FIG. 3B is an exploded view of the support mechanism of the headphone.

Next, with reference to FIGS. 3A and 3B, a configuration will be described of the support mechanism 260. The support mechanism 260 is a mechanism for attaching the left headphone 200 to the HMD 100 and supporting the left headphone 200, and includes the band holding unit 270, the rotation unit 280, and the slide guide 290.

The band holding unit 270 is formed with a groove portion 271 having an inverted U-shape opened downward. The groove portion 271 supports the support mechanism 260 and the left headphone 200 in a state of being mounted to the HMD 100 by sandwiching the left band portion 122 of the HMD 100. Note that, at the lower end of the groove portion 271, a hook may be provided having a claw-shape and protruding in an inward direction of the groove. In a state in which the left band portion 122 is sandwiched and held by the groove portion 271, the hook portion is hooked by the left band portion 122, whereby the left headphone 200 can be prevented from being inadvertently removed from the HMD 100.

The band holding unit 270 is provided with a first protruding portion 272 that generates click feeling by engaging with a second protruding portion 284 included in the rotation unit 280. The first protruding portion 272 and the second protruding portion 284 correspond to a click mechanism in the claims.

The band holding unit 270 is provided with a cord holding unit 273 having a horizontal U-shape. At the time of use of the headphones, the cord 250 of the HMD 100 is fitted into and held by the cord holding unit 273, whereby the cord 250 can be prevented from getting in the way.

A rotation center portion 281 is axially supported by a support pin (not illustrated) to the band holding unit 270, whereby the rotation unit 280 is formed to be rotatable in a direction in which the housing 230 is brought closer to the user's ear and in a direction in which the housing 230 is brought away from the user's ear. In the present embodiment, a first state is defined as a state in which the housing 230 is away from the user's ear, and a second state is defined as a state in which the housing 230 is approaching the user's ear. Note that, in the second state, normally, the ear pad 240 is in contact with the user's ear.

In the first state, a space becomes wide between the left headphone 200 and the left headphone 200, so that the first state is an optimal state in wearing the HMD 100 and the headphones. On the other hand, the second state is a state in which the ear pad 240 is in contact with the user's ear, which is an optimal state in use of the headphones.

The rotation unit 280 is formed such that rotation is regulated at a certain position due to that a lower regulation portion 282 comes in contact with the band holding unit 270, in rotation to a direction in which the ear pad 240 is brought closer to the user's ear. Furthermore, the rotation unit 280 is formed such that rotation is regulated at a certain position due to that an upper regulation portion 283 comes in contact with the band holding unit 270, in rotation to a direction in which the housing 230 is brought away from the user's ear. Thus, positions of the housing 230 can be switched between the first state and the second state by the rotation of the rotation unit 280.

Furthermore, the second protruding portion 284 is provided on the rotation unit 280, and the second protruding portion 284 gets over the first protruding portion 272 of the band holding unit 270 when the rotation unit 280 rotates and the first state and the second state are switched, whereby click feeling is generated.

The slide guide 290 is provided by being fixed to the rotation unit 280 with, for example, a bolt, a nut, and the like. The slide guide 290 includes a leaf spring-like slider holding unit 291 including a pair of protrusions respectively protruding outward in the left and right directions. The slider holding unit 291 is for holding a position of the slider 210 as well as generating click feeling accompanied by the slide of the slider 210 by being hooked by contiguous unevenness (not illustrated) of the inner surface of the slider 210. Note that, the slide position may be held by friction between the slider 210 and the slide guide 290.

Note that, as illustrated in the top view of FIG. 2, the slider 210 is formed to open at the upper end, so that the slide guide 290 can be removed and the support mechanism 260 can be detached from the headphone.

In the present technology, the left headphone 200 is attached so that the left band portion 122 of the HMD 100 and a slide direction of the slider 210 are not orthogonal to each other and have a predetermined angle. This point will be described with reference to FIGS. 4A and 4B.

Figure 4A:
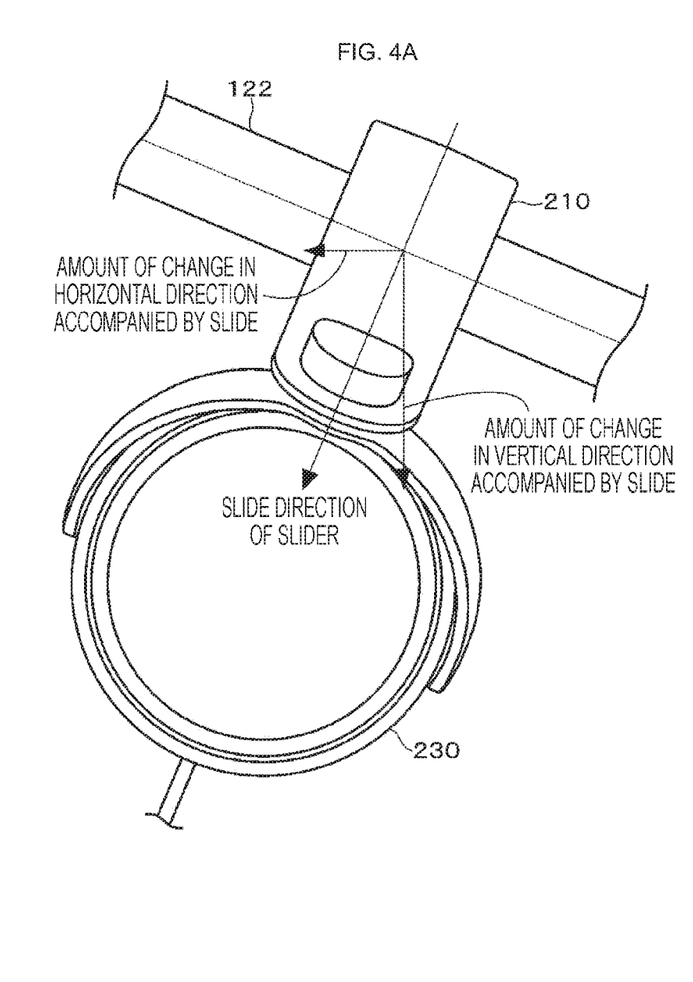
FIGS. 4A and 4B are explanatory diagrams of an angle formed by a band of the head mounted display and the slider.
Figure 4B:
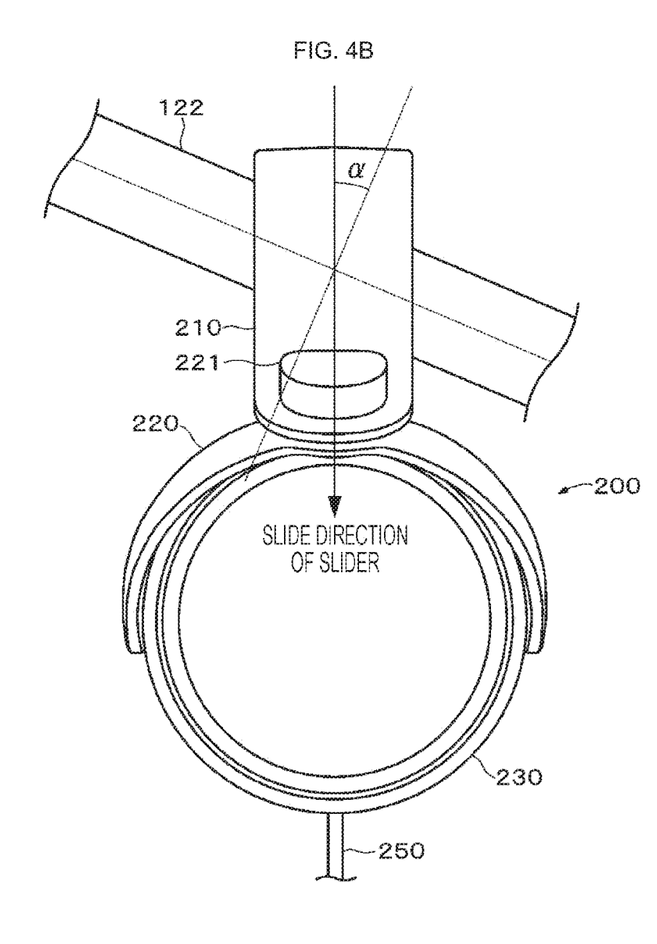

As described above, the band 120 of the HMD 100 comes in contact with the region from the forehead to the top of the head at a position where the front band portion 121 is higher than the contact position of the slide band portion 124 on the back of the user's head. As a result, the left band portion 122 is inclined downward from the front (user's forehead side) to the rear (side of the back of the user's head) when viewed from the side of the temporal region of the user's head (the right band portion 123 is similarly inclined).

When the left band portion 122 and the slide direction of the slider 210 is orthogonal to each other, as illustrated in FIG. 4A, when the slider 210 is slid, not only a position in the vertical direction (height direction) but also a position in the horizontal direction (lateral direction) changes, and it is difficult to adjust the housing 230 and the ear pad 240 to an appropriate position. Furthermore, since an amount of change in the vertical direction of the housing 230 and the ear pad 240 accompanied by the slide becomes smaller than an amount of slide of the slider 210, efficiency becomes worse of the position adjustment by the slide.

Since the slider 210 of the headphone is for adjusting the position in the vertical direction of the housing 230 and the ear pad 240, the slide direction of the slider 210 is desirably close to the vertical direction.

Thus, as illustrated in FIG. 4B, the left band portion 122 and the slide direction of the slider 210 are desirably not orthogonal to each other but have a predetermined angle α with respect to the vertical direction. The angle α changes depending on an inclination angle of the left band portion 122 and a position of the ear pad 240 at which the user feels that the position is optimal. However, since there is no large difference in inclination of the left band portion 122 in the HMD 100 among users, an average inclination angle of the left band portion 122 is set to 25 degrees in a state where the user wearing the HMD 100 faces the front, and with the 25 degrees as a reference, an angle has been measured actually felt by the user as being optimal. The results are indicated in Table 1 below. No. 1 to No. 30 in Table 1 each are a difference between 25 degrees and an angle felt as being optimal for each of 30 users measured.

TABLE 1

| No | Angle |
|----|-------|
| 1  | −3    |
| 2  | 5     |
| 3  | −5    |
| 4  | −5    |
| 5  | 15    |
| 6  | −4    |
| 7  | −10   |
| 8  | 5     |
| 9  | −6    |
| 10 | −3    |
| 11 | −4    |
| 12 | 5     |
| 13 | −5    |
| 14 | −2    |
| 15 | 3     |
| 16 | −9    |
| 17 | −3    |
| 18 | −4    |
| 19 | −3    |
| 20 | −6    |
| 21 | −10   |
| 22 | −15   |
| 23 | −8    |
| 24 | 4     |

TABLE 1-continued

| No | Angle |
|---|---|
| 25 | 0 |
| 26 | −2 |
| 27 | 11 |
| 28 | −3 |
| 29 | −5 |
| 30 | 2 |
| Average | −2 |

As indicated in the results of Table 1, many of the angles felt by the users as being optimal are different from the above-described 25 degrees. Thus, an average of the differences from 25 degrees is calculated, and from −2 degrees that is the average of the differences, and 25 degrees that is the reference angle, the predetermined angle α is calculated as 23 degrees.

As described above, the slide direction of the slider 210 has the predetermined angle α with respect to the left band portion 122, whereby the slider 210 can slide in the vertical direction. As a result, the position of the housing 230 and the ear pad 240 can be precisely adjusted by the slide of the slider 210.

Configuring the slide direction of the slider 210 to have the predetermined angle α can be implemented by attaching the slide guide to the rotation unit 280 in a state of being inclined at the predetermined angle α.

Note that, as indicated in Table 1, the angle felt by the user as being optimal is different for each user, so that the slide direction of the slider is not limited to 23 degrees. For example, from an upper limit angle of the measurement results indicated in Table 1, the angle can be 23 degrees±15 degrees.

The headphones are formed as described above.

[1-3. Use of Headphones]

Figure 5:
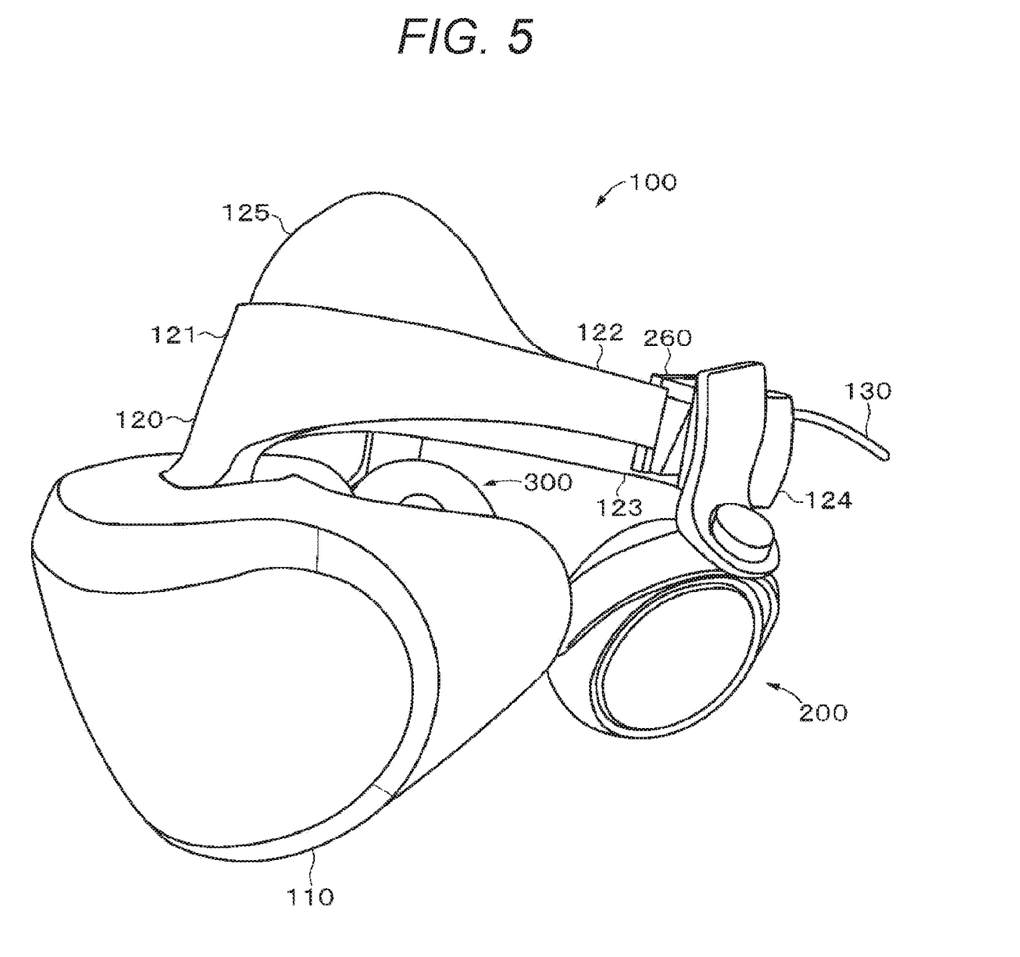
FIG. 5 is a perspective view illustrating a state in which the headphones are attached to the head mounted display.
Figure 6:
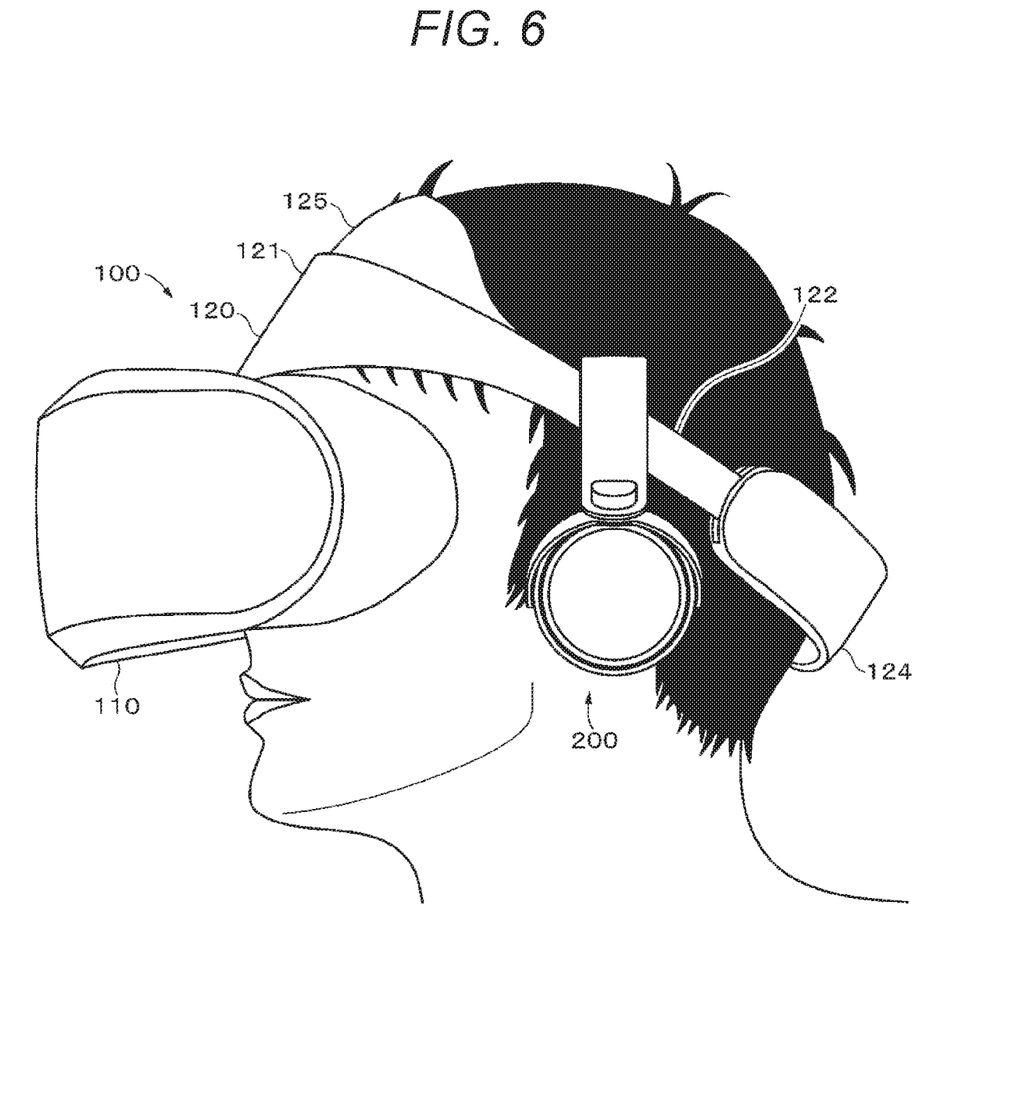
FIG. 6 is a diagram illustrating a state in which a user wears the head mounted display to which the headphones are attached.

Next, use of the headphones will be described with reference to FIGS. 5 and 6. Also in the use of the headphones, description will be made with reference to the left headphone 200. The use and attachment of the right headphone 300 is similar to those of the left headphone 200.

First, the user fits the cord 130 of the HMD 100 into the cord holding unit 273 before wearing the HMD 100. As a result, the cord holding unit 273 holds the cord 130, and the cord 130 does not get in the way at the time of wearing and using the HMD 100 and the headphones.

Next, the user fits the band holding unit 270 of the left headphone 200 into the left band portion 122 of the HMD 100 from above, and attaches the band holding unit 270 to the left band portion 122. As a result, the left headphone 200 is held by the left band portion 122 of the HMD 100. Note that, the left headphone 200 is desirably in the first state in which the housing 230 is away from the user's ear before the wearing of the HMD 100. This is because, in the first state, the housing 230 is away from the user's ear, and a distance is increased between the left headphone 200 and the right headphone 300, so that it becomes easy to wear the HMD 100 and the headphones.

Next, the slide band portion 124 of the HMD 100 is pulled backward, the space between the casing 110 and the slide band portion 124 is enlarged, and the HMD 100 is worn to cover the head. The wearing itself of the HMD 100 is similar in the case of using the headphones and in the case of not using the headphones.

Since the left headphone 200 and the right headphone 300 are attached to the HMD 100, when the HMD 100 is worn, the left headphone 200 and the right headphone 300 are also worn simultaneously. As described above, since the HMD 100, the right headphone 200, and the left headphone 300 can be worn simultaneously, there is no trouble or difficulty in which the HMD 100 is worn first and then the headphones are worn in a state where a field of view is blocked by the HMD 100 as before.

After the adjustment is completed of a wearing position and wearing feeling of the HMD 100, the user rotates the rotation unit 280 by pushing the housing 230 and/or the slider 210 in a direction toward the ear, and causes a change from the first state in which the housing 230 is away from the user's ear to the second state in which the housing 230 is approaching the user's ear. In the second state, the ear pad 240 comes in contact with the user's ear, so that the user can listen to powerful sound from the headphones.

Note that, since click feeling is generated by the click mechanism in the change from the first state to the second state, the user feels the click feeling, thereby being able to grasp that a change has occurred from the first state to the second state. Furthermore, conversely, in the change from the second state to the first state, the user has to apply force to cause the first protruding portion 272 to get over the second protruding portion 284, so that the change from the second state to the first state does not occur against the user's intention during the use of the HMD 100.

Note that, in a case where the position of the ear pad 240 does not match the position of the user's ear, the user can adjust the position of the ear pad 240 by sliding the slider 210.

As described above, the left band portion 122 and the slide direction of the slider 210 are not orthogonal to each other and have the predetermined angle α. Thus, the user can precisely adjust the position of the ear pad 240 by sliding the slider 210.

In the case of ending the use of the HMD 100, or removing the HMD 100 to temporarily suspend the use, the user rotates the rotation unit 280 by pulling the housing 230 and/or the slider 210 in a direction away from the ear. As a result, the change occurs from the second state to the first state. In the first state, the distance is increased between the left headphone 200 and the right headphone 300, and it becomes easy to remove the HMD 100.

Note that, in a case where the user is playing a so-called horror game or the like that gives the user a sense of fear using the HMD 100, it is conceivable that the user tries to suddenly remove the HMD 100 due to the fear. In the present technology, the left headphone 200 and the right headphone 300 are attached to the HMD 100, and if the HMD 100 is removed, the left headphone 200 and the right headphone 300 are simultaneously removed. Thus, even in such a case, the user can immediately remove the HMD 100, the left headphone 200, and the right headphone 300. Furthermore, the HMD 100, the left headphone 200, and the right headphone 300 will not be damaged as a result of trying to remove them forcibly in too much rushing.

Furthermore, since the left headphone 200 and the right headphone 300 of the present technology are removed together if the user removes the HMD 100, there is no possibility that the headphones remain in the wearing state even though the user removes the HMD 100 to escape from the fear of the game and the user continues to listen to the sound.

Furthermore, since the HMD 100 and the headphones are separate bodies, unlike a product in which the HMD 100 and the headphones are integrated, only the headphones can be replaced in a case where the headphones fail.

Since the HMD 100, the left headphone 200, and the right headphone 300 are separate bodies, unlike a product in which the HMD 100 and the headphones are integrated, attachment positions can be adjusted of the left headphone 200 and the right headphone 300 with respect to the HMD 100.

Note that, the left headphone 200 and the right headphone 300 may be connected to a U-shaped headband and used as a headphone having a general shape. When the headphones according to the present technology are provided and sold, the headphones may be provided and sold with the headband bundled. Alternatively, the headband may be separately provided and sold so that the user can obtain it when necessary.

Figure 7:
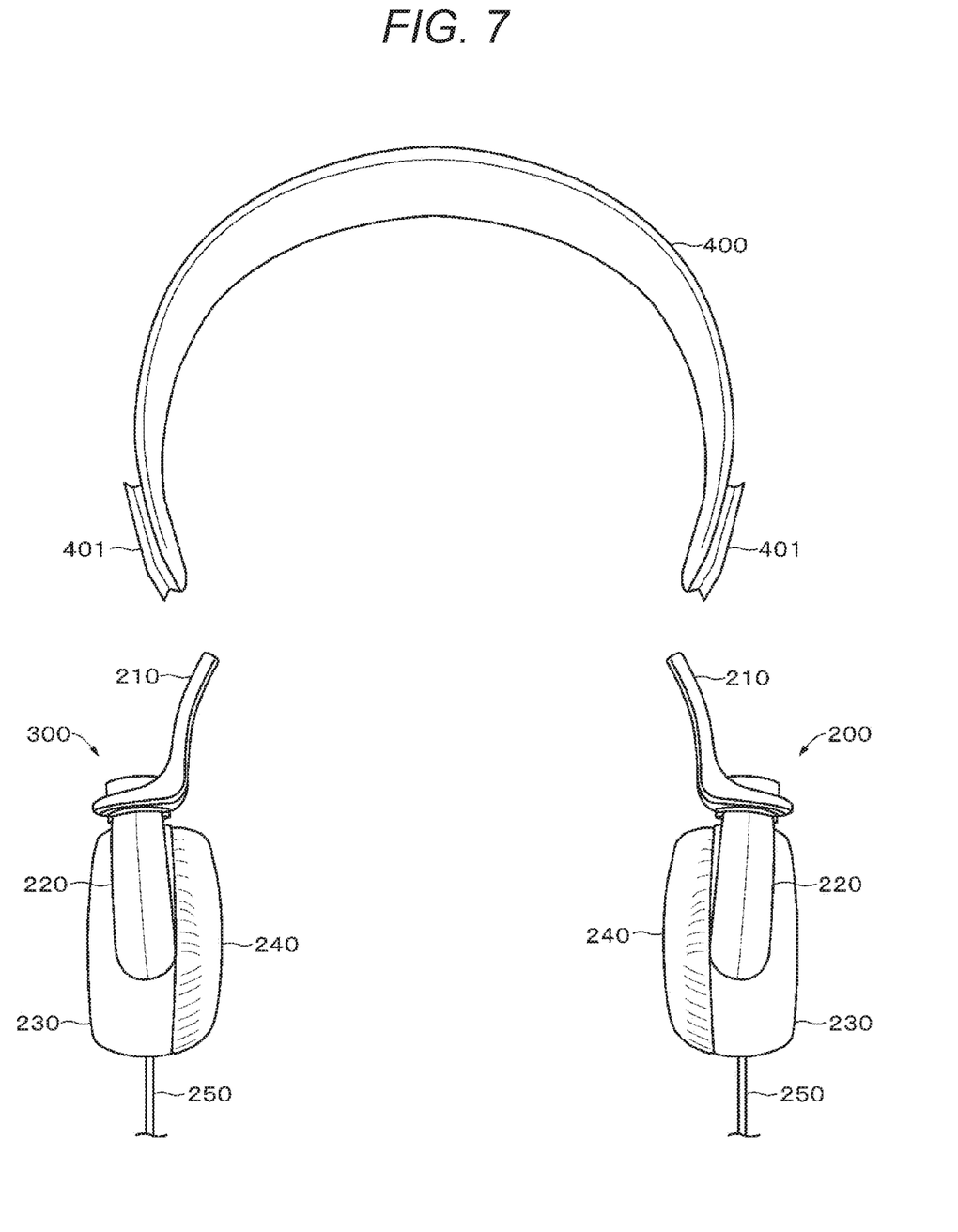
FIG. 7 is a diagram illustrating a headband to be connected to the headphones.

As illustrated in FIG. 7, a headband 400 is formed in a curved shape along the user's head, and supports the entire headphones by coming in contact with the user's top of the head in the wearing state. Slide guides 401 are respectively provided at the left and right ends of the headband 400, and the slide guides 401 each are fitted into the slider 210, whereby the left headphone 200 and the right headphone 300 can be slidably connected to the headband 400. The slide guides 401 each have a configuration similar to the slide guide 290. The headband 400 is formed by using synthetic resin such as plastic, metal, or the like, and has flexibility by having predetermined rigidity and elasticity. As a result, at the time of wearing, the housing 230 and the ear pad 240 can be pressed in a direction toward the temporal region of the user's head, and the wearing state can be maintained of the left headphone 200 and the right headphone 300.

The headband 400 may be provided with a cover for covering. The cover functions as a cushioning material at a portion in contact with the top of the user's head in the inner surface of the headband 400, and also plays a role of preventing the internal structure of the headband 400 from being exposed. Note that, instead of the cover, an elastic body such as a cushion or rubber may be provided in the portion in contact with the top of the user's head. Furthermore, the headband 400 may be provided with a hinge so that it can be folded at the center at the time of carrying.

2. Modifications

The embodiments of the present technology have been specifically described above; however, the present technology is not limited to the embodiments described above, and various modifications can be made based on the technical idea of the present technology.

Figure 8:
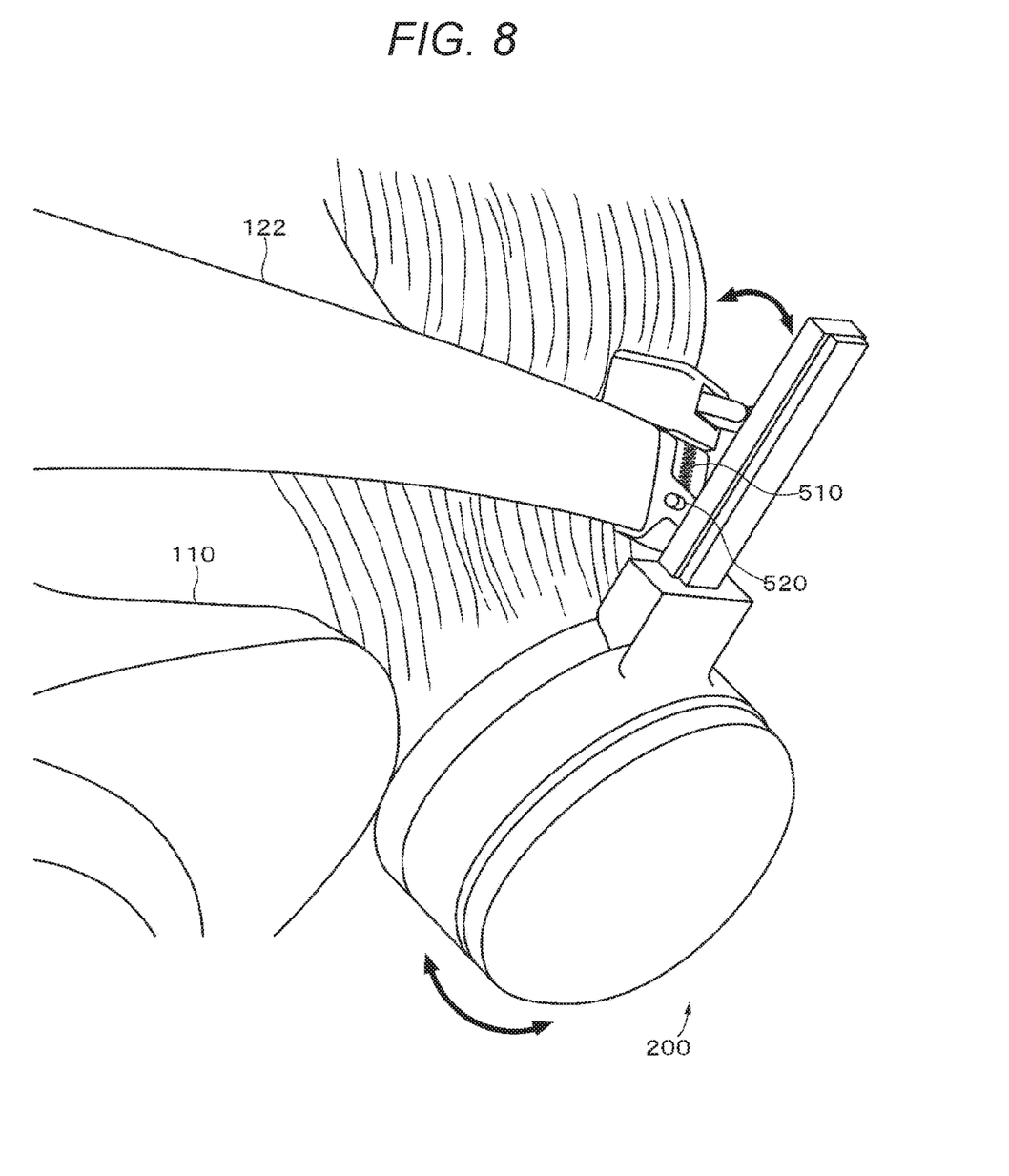
FIG. 8 is a perspective view illustrating a headphone according to a modification.

The operation mechanism of the rotation unit 280 can be implemented by using an elastic body 510 such as a torsion coil spring as illustrated in FIG. 8 in addition to the one described in the embodiment. In a case where the elastic body 510 such as a torsion coil spring is used, instead of switching between the two states of the first state and the second state as in the embodiment, a configuration may be made in which seamless change is caused between a state in which the ear pad 240 is in contact with the user's ear and a state in which the ear pad 240 is away from the user's ear, by rotation around a rotation shaft 520.

Furthermore, the rotation unit 280 may be formed so that the ear pad 240 is always biased by an elastic body such as a spring in a direction in which the ear pad 240 comes in contact with the user's ear, and maintained in the second state by engagement of protrusions or the like, and switching may be caused from the second state to the first state by releasing the engagement of the protrusions by button operation or the like.

In the embodiment, the click mechanism is implemented by engagement and getting over of the first protruding portion 272 and the second protruding portion 284, but the click mechanism may be implemented by another configuration. For example, two protrusions may be engaged with each other, and the second state may be maintained in the engaged state, and the first state may occur when the engaged state is released by button operation.

By operation of the rotation unit 280, the housing 230 may be rotated in a direction toward the band 120 of the HMD 100 to a state in which the housing 230 is not in contact with a plane when the HMD 100 is placed on the plane.

In the embodiment, the first state is described as the optimal state when the HMD 100, the left headphone 200, and the right headphone 300 are worn, but the HMD and the headphones may be used in the first state. When the HMD and the headphones are used in the first state, since there is a space between the ear pad 240 and the user's ear, the user can listen to sound from the outside while listening to sound from an entertainment apparatus. Furthermore, in a case where the ear is steamed for a long time use, by changing from the second state to the first state, the space between the ear and the ear pad 240 is opened while the use is continued, and ventilation can be improved.

The headphone according to the present technology can be applied not only to the HMD 100, but also to an apparatus having a band shape from the user's face to the temporal region of the head, an apparatus that does not include a casing and directly supports the display unit with a band, or the like. As such an apparatus, for example, there is a glasses-type wearable terminal.

Furthermore, the headphone does not have to include the cord 250, and may be connected to an entertainment apparatus that outputs a sound signal by wireless communication such as Bluetooth (registered trademark).

The present technology can also adopt the following configurations.

(1)

A headphone including:

a housing;

a slider configured to support the housing; and a support unit attached to a head mounted display and configured to slidably support the slider.

(2)

The headphone according to (1), in which the head mounted display includes a display unit, and a band configured to support the display unit by using a user's head, and the support unit is attached to the band.

(3)

The headphone according to (2), in which the band is formed to span at least a temporal region of the user's head, and the support unit is attached to the band at a side of the temporal region of the user's head.

(4)

The headphone according to (2) or (3), in which a slide direction of the slider has a predetermined angle with respect to a direction orthogonal to the band.

(5)

The headphone according to (4), in which the predetermined angle is about 23 degrees.

(6)

The headphone according to (4) or (5), in which the predetermined angle is about 23 degrees±15 degrees.

(7)

The headphone according to any of (1) to (6), in which the support unit includes an operation unit that causes the housing to operate in a direction away from the user's ear or to operate the housing in a direction toward the user's ear.

(8)

The headphone according to (7), in which the operation unit causes a change to a first state in which the housing moves away from a user's ear or a second state in which the housing approaches the user's ear.

(9)

The headphone according to (8), further including a click mechanism that generates a click feeling along with a change from the first state to the second state and a change from the second state to the first state.

(10)

The headphone according to any of (7) to (9), in which the operation unit causes a change to a state in which the housing is not in contact with a plane when the head mounted display is placed on the plane.

(11)

The headphone according to any of (1) to (10), in which a headband is connectable to the slider in a state in which the support unit is detached from the slider.

(12)

The headphone according to any of (1) to (11), further including a cord holding unit that holds a cord included in the head mounted display.

(13)

The headphone according to any of (1) to (12), further including an ear pad on a side facing a user's ear of the housing, in which the ear pad includes low repulsion urethane.

REFERENCE SIGNS LIST

230 Housing
210 Slider
100 Head mounted display
260 Support mechanism
200 Left headphone
300 Right headphone

The invention claimed is:

1. A headphone, comprising:
a housing;
a slider configured to support the housing; and
a support unit configured to:
attach the headphone to a head mounted display; and
slidably support the slider, wherein
the support unit includes an operation unit configured to:
operate the housing in one of a first direction away from a user ear or a second direction toward the user ear; and
set a state, of the housing, in which the housing is spaced apart from a plane of the user ear, and
the state of the housing is set based on the operation of the housing and presence of the head mounted display on the plane.

2. The headphone according to claim 1, wherein
the head mounted display includes:
a display unit; and
a band that supports the display unit, and
the support unit is attached to the band.

3. The headphone according to claim 2, wherein
the band is able to span at least a temporal region of a user head, and
the support unit is attached to the band at a side of the temporal region of the user head.

4. The headphone according to claim 3, wherein a slide direction of the slider has a specific angle with respect to an orthogonal direction orthogonal to the band.

5. The headphone according to claim 4, wherein the specific angle is 23 degrees.

6. The headphone according to claim 4, wherein the specific angle is 23 degrees±15 degrees.

7. The headphone according to claim 1, wherein
the operation unit is further configured to change the state of the housing to one of a first state or a second state, and
the housing is configured to:
move away from the user ear in the first state; and
move toward the user ear in the second state.

8. The headphone according to claim 7, further comprising a click mechanism that includes:
a first protruding portion; and
a second protruding portion, wherein
the first protruding portion is configured to engage with the second protruding portion a based on the change of the state of the housing from one of the first state to the second state or the second state to the first state.

9. The headphone according to claim 1, wherein the slider is further configured to connect to a headband based on detachment of the support unit from the slider.

10. The headphone according to claim 1, further comprising a cord holding unit configured to hold a cord of the head mounted display.

11. The headphone according to claim 1, further comprising an ear pad on a side of the housing that faces the user ear, wherein the ear pad includes low repulsion urethane.

* * * * *